US011080878B2

(12) United States Patent
Choi et al.

(10) Patent No.: US 11,080,878 B2
(45) Date of Patent: Aug. 3, 2021

(54) METHOD AND APPARATUS FOR DETECTING 3D OBJECT FROM 2D IMAGE

(71) Applicant: SAMSUNG ELECTRONICS CO., LTD., Suwon-si (KR)

(72) Inventors: Hee-min Choi, Seoul (KR); Hyo-a Kang, Seoul (KR); Yoon-suk Hyun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 78 days.

(21) Appl. No.: 16/545,659

(22) Filed: Aug. 20, 2019

(65) Prior Publication Data

US 2020/0143557 A1    May 7, 2020

(30) Foreign Application Priority Data

Nov. 1, 2018    (KR) .................. 10-2018-0133044

(51) Int. Cl.
*G06T 7/62* (2017.01)
*G06T 7/70* (2017.01)

(52) U.S. Cl.
CPC .............. *G06T 7/62* (2017.01); *G06T 7/70* (2017.01); *G06T 2207/20084* (2013.01)

(58) Field of Classification Search
CPC .......... G06T 7/70; G06T 7/62; G06K 9/00208
See application file for complete search history.

(56) References Cited

U.S. PATENT DOCUMENTS

| 8,736,463 | B1 | 5/2014 | Zhu et al. |
| 8,749,630 | B2 | 6/2014 | Alahi et al. |
| 9,396,553 | B2 | 7/2016 | Fan et al. |
| 9,418,480 | B2 | 8/2016 | Issa et al. |
| 9,514,389 | B1 | 12/2016 | Erhan et al. |
| 9,558,584 | B1 | 1/2017 | Lo et al. |
| 9,563,955 | B1 * | 2/2017 | Kamarshi ......... G06K 9/00791 |
| 9,805,505 | B2 | 10/2017 | Datta et al. |
| 10,032,278 | B2 | 7/2018 | Ishida |
| 2017/0164920 | A1 | 6/2017 | Lavallee et al. |
| 2017/0220887 | A1 * | 8/2017 | Fathi ................. G06K 9/00208 |

FOREIGN PATENT DOCUMENTS

| KR | 10-1998-0059962 A | 10/1998 |
| KR | 10-0777199 B1 | 11/2007 |
| KR | 10-0920931 B1 | 10/2009 |
| KR | 10-0974413 B1 | 7/2010 |

OTHER PUBLICATIONS

A. Mousavian, et al., "3D Bounding Box Estimation Using Deep Learning and Geometry", 2017, pp. 1-10.

* cited by examiner

*Primary Examiner* — Myron Wyche
(74) *Attorney, Agent, or Firm* — Lee IP Law, P.C.

(57) ABSTRACT

A method of detecting a 3D object from a 2D image includes receiving a 2D image including an object, acquiring an object detection region from the 2D image, iteratively searching for candidates for a direction of a volume including the object of the 2D image in a 3D coordinate system based on the object detection region, and detecting the volume from the 3D coordinate system based on results of the iterative searching.

18 Claims, 9 Drawing Sheets

METHOD AND APPARATUS FOR DETECTING 3D OBJECT FROM 2D IMAGE

CROSS-REFERENCE TO RELATED APPLICATION

Korean Patent Application No. 10-2018-0133044, filed on Nov. 1, 2018, in the Korean Intellectual Property Office, and entitled: "Method and Apparatus for Detecting 3D Object from 2D Image," is incorporated by reference herein in its entirety.

BACKGROUND

1. Field

Embodiments relate to a method and apparatus for detecting a 3D object from a 2D image.

2. Description of the Related Art

Object detection techniques are for detecting a region containing an object from an image. For example, a two-dimensional (2D) bounding box that surrounds an object may be detected from a 2D image using an object detection technique. A 2D bounding box may be specified by the location and size of the 2D bounding box in an image. Object detection techniques may be performed through image processing based on a neural network. In addition, a three-dimensional (3D) bounding box refers to a volume surrounding an object in a 3D coordinate system and may be, e.g., specified by the location, size, and direction of the 3D bounding box in the 3D coordinate system. Applications requiring 3D bounding boxes may include, e.g., driving applications.

SUMMARY

According to an aspect of embodiments, there is provided a method of detecting a 3D object from a 2D image, the method including receiving a 2D image including an object, acquiring an object detection region from the 2D image, iteratively searching for candidates for a direction of a volume including the object in a 3D coordinate system based on the object detection region, and detecting the volume from the 3D coordinate system based on results of the searching.

According to another aspect of embodiments, there is provided an apparatus for detecting a 3D object from a 2D image, including a memory configured to store a 2D image including an object, and at least one processor configured to acquire an object detection region from the 2D image, iteratively search for candidates for a direction of a volume including the object in a 3D coordinate system based on the detection region, and detect the volume from the 3D coordinate system based on results of the search.

BRIEF DESCRIPTION OF THE DRAWINGS

Features will become apparent to those of skill in the art by describing in detail exemplary embodiments with reference to the attached drawings, in which.

DETAILED DESCRIPTION

Figure 1:
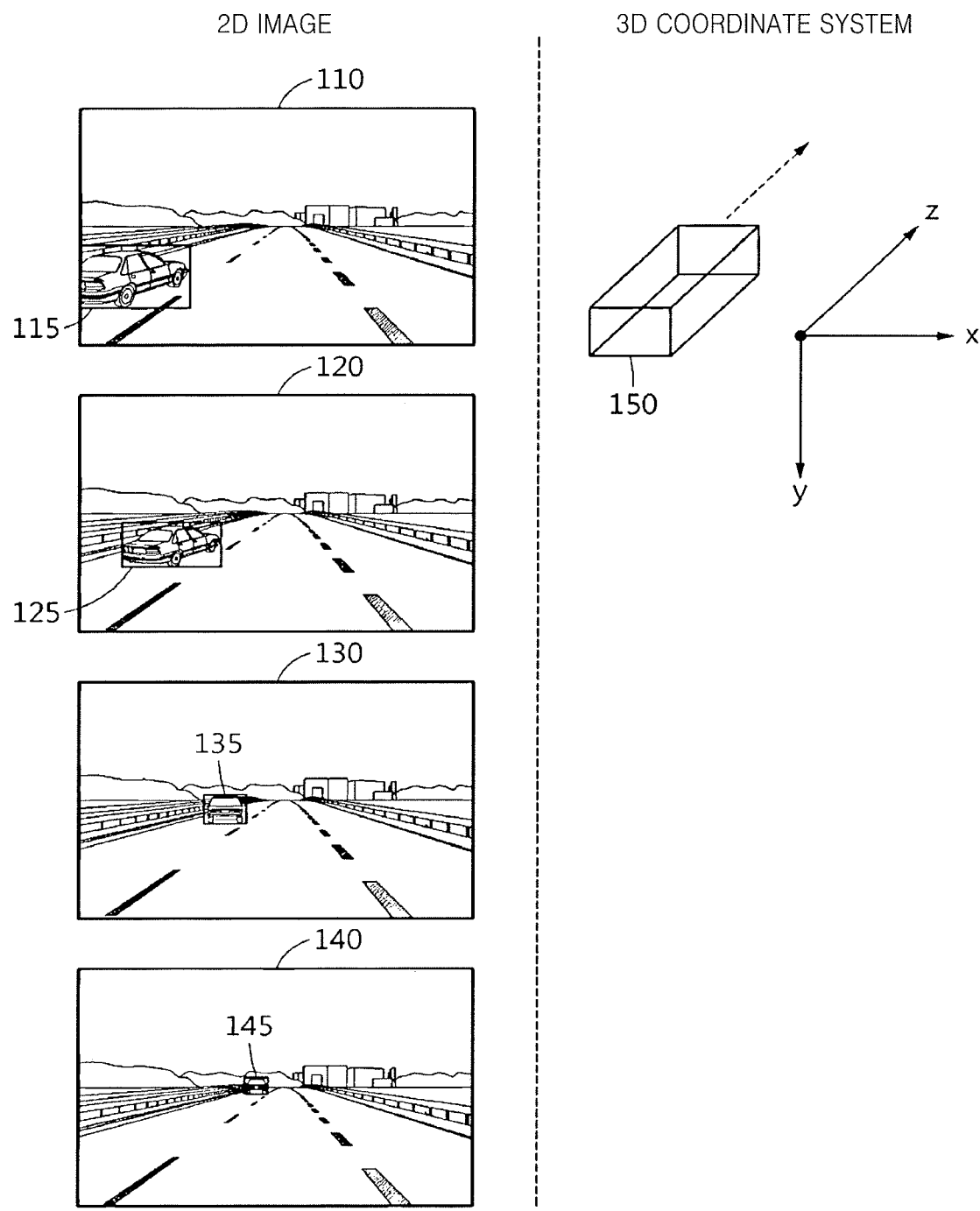
FIG. 1 illustrates a view of an object detection method according to an embodiment.

Specific structural or functional descriptions presented in the present specification are example descriptions for describing embodiments according to technical concepts, and the embodiments may be implemented in various other forms without being limited to the forms described in the present specification.

Although the terms "first" and "second" are used to describe various elements, these terms are only used to distinguish one element from another element. For example, a first element may be referred to a second element, and similarly a second element may be referred to as a first element.

It should be understood that when an element is referred to as being "coupled" or "connected" to another element, the element may be coupled or connected directly to the other element or any other element may be between the two elements. In contrast, it may be understood that when an element is referred to as being "directly coupled" or "directly connected" to another element, there is no element interposed between the two elements. Expressions used to describe a relationship between elements, e.g., "on," "directly on," "between," "directly between," "neighboring," or "directly neighboring" should be interpreted in the same manner.

The terms of a singular form may include plural forms unless otherwise mentioned. In the present specification, it is to be understood that terms such as "including," "having," or "comprising" are intended to the existence of a property, a fixed number, a step, a process, an element, a component, or a combination thereof but are not intended to preclude one or more other properties, fixed numbers, steps, processes, elements, components, or combinations thereof.

Unless defined otherwise, all terms used herein, including technical and scientific terms, have the same meanings as those commonly understood by those skilled in the art. Terms such as those defined in a generally used dictionary may be interpreted to have the same meanings as the contextual meanings in the relevant field of art, and are not to be interpreted to have ideal or excessively formal meanings unless clearly defined herein.

Hereinafter, embodiments will be described with reference to the accompanying drawings. In the drawings, like reference numerals refer to like elements throughout.

FIG. 1 is a view illustrating an object detection method according to an embodiment. Referring to FIG. 1, 2D images and a 3D coordinate system are shown according to an embodiment. The 2D images contain objects.

For example, to detect an object from a 2D image, an object region may be detected by inputting the 2D image to a learned neural network. A detected region of an object may be a 2D bounding box surrounding the object in the 2D image.

For example, the 2D image may be an image in which a vehicle is travelling. It is assumed that a first frame 110, a second frame 120, a third frame 130, and a fourth frame 140 are input with time. In each frame, another vehicle running in an adjacent lane may be detected as an object. A first bounding box 115 may be detected in the first frame 110, a second bounding box 125 may be detected in the second frame 120, a third bounding box 135 may be detected in the third frame 130, and a fourth bounding box 145 may be detected in the fourth frame 140.

The 2D bounding boxes may be rectangular and may be specified in various ways. For example, the 2D bounding boxes may be specified using the coordinates of four corner points. Alternatively, the 2D bounding boxes may be specified by a location-size combination. A location may be expressed by the coordinate of a corner or a center point, and a size may be expressed by a width or a height.

According to an embodiment, a volume containing the object in the 3D coordinate system may be detected based on detection regions of the object in the 2D images. The 3D coordinate system may be a world coordinate system. The volume may be a 3D bounding box surrounding the object in the 3D coordinate system. For example, a 3D bounding box 150 corresponding to the first frame 110, the second frame 120, the third frame 130, and the fourth frame 140 may be detected from the 3D coordinate system. When the object moves with time, the 3D bounding box 150 also moves in the 3D coordinate system.

The 3D bounding box may be a rectangular parallelepiped and may be specified in various ways. For example, the 3D bounding box may be specified using the coordinates of eight corner points. Alternatively, the 3D bounding box may be specified using a combination of locations and sizes. A location may be expressed by the coordinate of a corner point or the coordinate of a center point on a bottom surface, and a size may be expressed by a width, a length, or a height. A direction may be represented by a direction vector of a line normal to a surface. A direction vector may correspond to the degree (e.g., yaw, pitch, roll) of rotation of the 3D bounding box from three axes of the 3D coordinate system (e.g., x-axis, y-axis, z-axis). Direction may also be referred to as orientation.

Since 2D images do not include depth information in the z-axis direction, the 3D bounding box 150 may be detected from the 2D bounding boxes using projective geometry. Projective geometry involves properties in a 2D image that may not vary when a geometric object undergoes projective transformation.

According to an embodiment, in a 2D image, an object may be partially hidden by another object or may be partially cut off along the boundary of the 2D image. In this case, a detection region of the object may not entirely include the object. For example, referring to the first frame 110, the left side of the other vehicle traveling in an adjacent lane is cut off along the boundary of the image, so the first bounding box 115 does not include a portion not displayed in the image, i.e., the first bounding box 115 does not include the cut off portion of the other vehicle.

If a region of an object detected from a 2D image does not entirely include the object, a volume of the object may not be exactly detected in the 3D coordinate system. However, according to an embodiment, even if the object is partially hidden or cut off in the 2D image, the object is to be expressed as a complete object in a 3D coordinate system. Embodiments below describe techniques for accurately detecting a volume in a 3D coordinate system even if an object is partially hidden or cut off in a 2D image by iteratively searching for candidates for the direction of the volume in a 3D coordinate system based on projective geometry.

Figure 2:
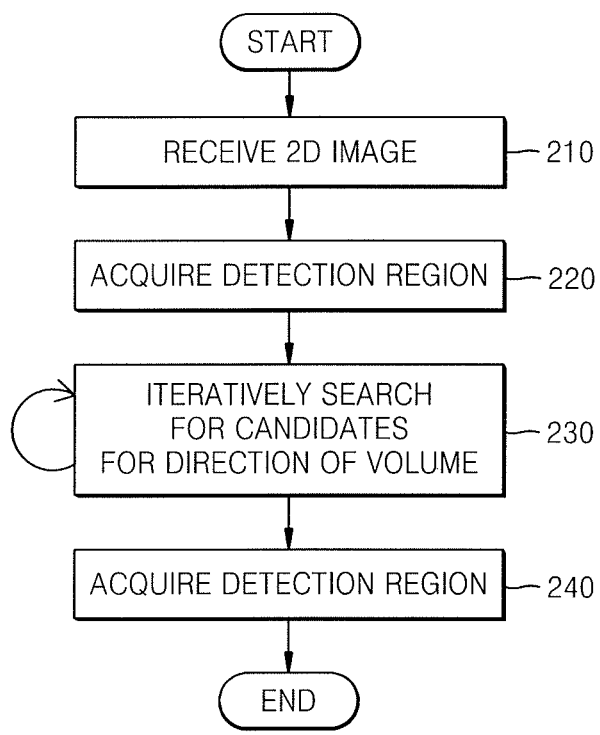
FIG. 2 illustrates an operational flowchart of an object detection method according to an embodiment.

FIG. 2 is an operational flowchart illustrating an object detection method according to an embodiment.

Referring to FIG. 2, the object detection method of the embodiment includes an operation 210 of receiving a 2D image including an object, an operation 220 of obtaining an object detection region from the received 2D image, an operation 230 of iteratively searching for volume direction candidates in a 3D coordinate system on the basis of the obtained object detection region in operation 220, and an operation 240 of detecting a volume in the 3D coordinate system on the basis of results of the iterative search in operation 230. At this time, at least a portion of the object included in the received 2D image in operation 210 may be hidden by another object or may be partially cut off along the boundary of the received 2D image.

In detail, in operation 210, the received 2D image may be an image captured with a camera.

In operation 220, the detection region detected from the received 2D image may be a 2D boundary box. The detection region may be detected from the 2D boundary box as described above, e.g., specified using coordinates of four corner points or by a location-size combination.

In operation 220, not only the detection region is detected, but also the direction of the object (hereinafter referred to as a local direction) may be further acquired from the received 2D image. For example, a neural network may be used, and the neural network may receive the 2D image and output a local direction as the direction of the object in the 2D image.

The direction of the object in the 2D image (hereinafter referred to as a local direction) may be converted into the direction of the object in the 3D coordinate system (hereinafter referred to as a global direction) on the basis of projective geometry. For example, referring to FIG. 4, a ray direction 410 is defined from the camera to a center of the object in the 2D image. The camera may be aligned with an axis 430 (e.g., an x-axis) of the 3D coordinate system. The ray direction 410 may be expressed using a ray angle $\theta_{ray}$, i.e., an angle between the ray direction 410 and the axis 430 that is smaller than 180°. In the 2D image, the local direction may be expressed using a local angle $\theta_L$ between the ray direction 410 and a direction 420 of the object, e.g., an angle between the ray direction 410 and the direction 420 of the car in FIG. 4 that is larger than 180°. In addition, the global direction in the 3D coordinate system may be expressed using a global angle $\theta_G$ between a direction 435 parallel to the axis 430 and the direction 420 of the object. The global angle $\theta_G$ may be calculated by adding up the ray angle $\theta_{ray}$ and the local angle $\theta_L$.

Figure 4:
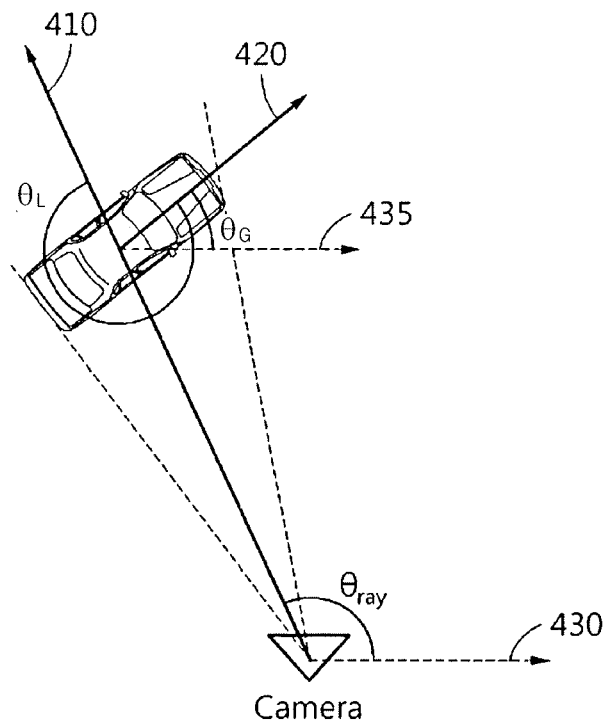
FIG. 4 illustrates a view of directions according to an embodiment.

If the object detection region in the 2D image completely contains the object, the ray angle $\theta_{ray}$ may be determined by a direction from the camera toward the center of the object detection region, e.g., from the camera to the center of the car in FIG. 4. However, if at least a portion of the object is hidden or cut off, the ray angle $\theta_{ray}$ determined by the direction from the camera toward the center of the object detection region may be inaccurate.

As described below, in operation 220, the size of the volume in the 3D coordinate system may be further acquired. The volume may be a rectangular parallelepiped, and the size of the volume may include dimensions of a width, a length, and a height. For example, a learned neural network may identify the class or type of the object to be detected. The neural network may output the size of the volume according to the identified class or type. For ease of description, it has been described that the size of the volume is determined after the class or type of the object is identified. In some embodiments, however, the neural network may be an end-to-end neural network that receives a 2D image and directly outputs the size of a volume.

At least some of neural networks may be used in operation 220. For example, a first neural network configured to determine and output a detection region, a second neural network configured to determine and output a local direction, a third neural network configured to determine and output a volume size, etc. may be united as a single neural network.

According to an embodiment, in operation 230 of the object detection method, volume direction candidates corresponding to the direction of the volume are iteratively searched for. Thus, even if at least a portion of the object is hidden or cut off, the volume may be accurately detected or restored. Operation 230 will be described in detail below with reference to FIG. 3.

In operation 240, after the volume direction is detected on the basis of the iterative search results in operation 230, a detected volumetric region that contains the objection of the 2D image may be specified by its location, size, and orientation in the 3D coordinate system. As described above, the method of specifying the volume may be variously modified, e.g., to a method of specifying the volume using the coordinates of eight corner points.

Figure 3:
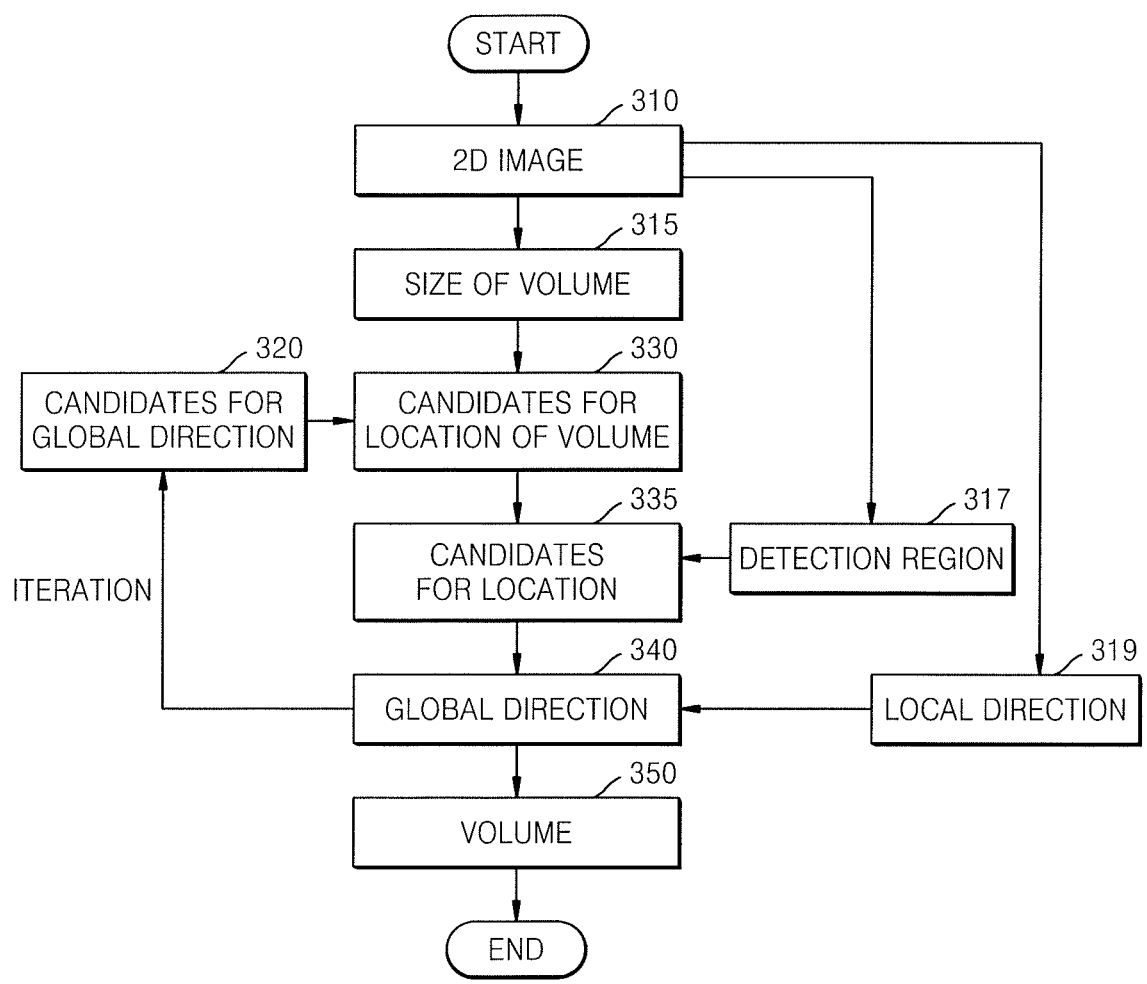
FIG. 3 illustrates a detailed flow chart of operations of the object detection method according to an embodiment.

Hereinafter, operation 230 of iteratively searching for volume direction candidates will be described in detail with reference to FIG. 3. FIG. 3 is a detailed flow chart of operation 230 according to an embodiment.

Referring to FIG. 3, a volume size 350 is detected from a 2D image 310. The 2D image 310 is the image captured by the camera in operation 210 of FIG. 2, and includes an object that is at least partially hidden or cut off.

First, when the 2D image 310 is received (in operation 210), an object detection region 317 and an object local direction 319 are obtained on the basis of the 2D image 310, as described above with reference to operation 220 of FIG. 2. Further, the size of the volume 315 of the detection region based on the 2D image received in operation 210 may also be obtained, as described above. The above descriptions may be applied herein, and thus, a detailed description will not be repeated.

Next, candidates 320 for a global direction in which the volume 350 may be oriented in a 3D coordinate system are generated. Initial global direction candidates may be generated on the basis of a predetermined search range and resolution. It is noted that "candidates" refer to possibilities, so directional candidates refer to possible directions that are examined in order to determine the actual direction of an object in the 3D coordinate system.

Figure 5:
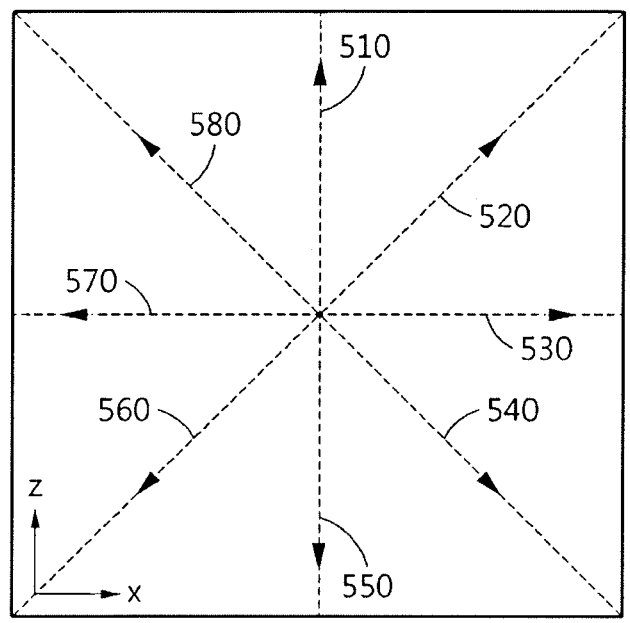
FIG. 5 illustrates a view of candidates for the direction of a volume according to an embodiment.

FIG. 5 shows eight global directional candidates 510, 520, 530, 540, 550, 560, 570, and 580 generated in the x-z plane of the 3D coordinate system. In this case, the search range may be from $-\pi$ to $\pi$ in the x-z plane, and the resolution may be $\pi/4$. According to an embodiment, since the shape of the volume 350 is symmetrical in the direction of the volume 350, the search range may be set to be from 0 to $\pi$.

According to an embodiment, a global direction, which is determined by a ray direction from a camera toward a detection region (for example, a 2D bounding box) and the object local direction 319, may also be included in the initial global direction candidates. An inaccurate global direction may be calculated when using a ray direction pointing to a detection region of an object which is at least partially hidden or cut off, but the inaccurate global direction may be used as a starting point for searching for global direction candidates.

Figure 6A:
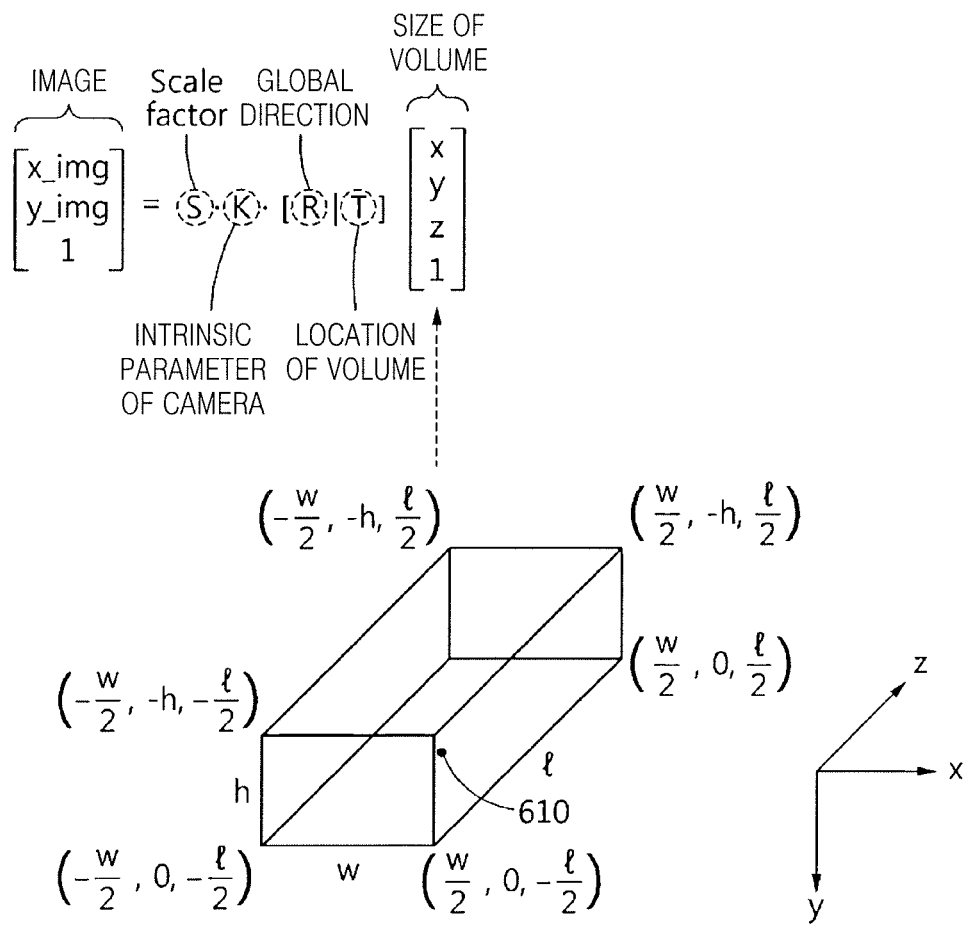
FIG. 6A illustrates a view of a method of determining the location of a volume, according to an embodiment.

Volume location candidates 330 may be estimated in the 3D coordinate system on the basis of the global direction candidates 320 and the volume size 315. Referring to FIG. 6A, a corresponding relationship between pixels of a 2D image and 3D coordinates is shown on the basis of projective geometry. The 3D coordinates may be projected onto the pixels of the 2D image through a relational equation shown in FIG. 6A.

In FIG. 6A, coordinate (x, y, z) corresponds to a 3D coordinate in the 3D coordinate system. Assuming that a center point 610 of a lower surface of a volume is located at the origin of the 3D coordinate system, the 3D coordinates of eight corners of the volume may be expressed by the size of the volume. For example, if the width of the volume is w, the length of the volume is l, and the height of the volume is h, the 3D coordinates of four corners of the lower surface of the volume may be $(-w/2, 0, -l/2)$, $(w/2, 0, -l/2)$, $(w/2, 0, l/2)$, and $(-w/2, 0, l/2)$, and the 3D coordinates of four corners of an upper surface of the volume may be $(-w/2, -h, -l/2)$, $(w/2, -h, -l/2)$, $(w/2, -h, l/2)$, and $(-w/2, -h, l/2)$.

Further, referring to FIG. 6A, T is a movement matrix relating to the location of the volume. The location of the volume may be estimated using T obtained by solving the equation of FIG. 6A. R is a rotation matrix which may be determined by the global direction of the volume. Candidates for the location of the volume that respectively correspond to the global direction candidates may be estimated. K refers to an intrinsic parameter of a camera, and S refers to a scaling factor. Further, (x_img, y_img) refer to pixel coordinates of the 2D image.

Figure 6B:
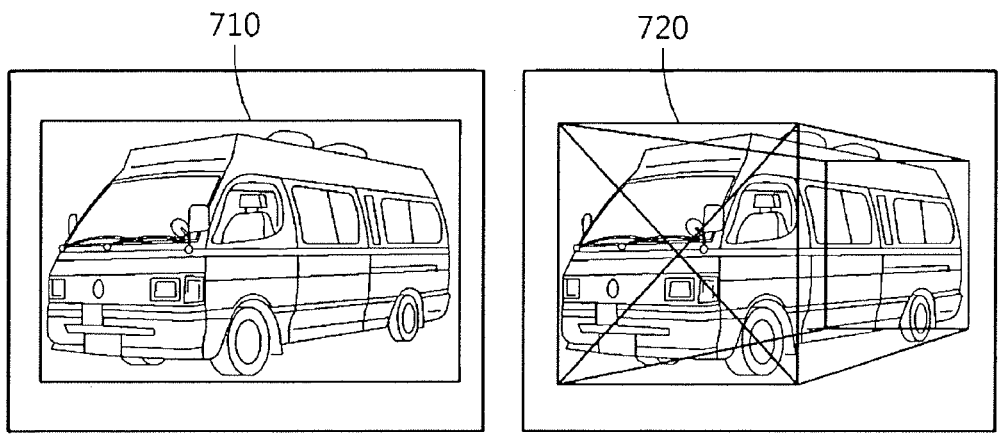
FIG. 6B illustrates a view of a corresponding relationship between a 2D bounding box and a 3D bounding box according to an embodiment.

FIG. 6B shows a corresponding relationship between first characteristic points included in an object detection region 710 of a 2D image and second characteristic points included in an object volume 720 in a 3D coordinate system. Some of the first characteristic points and some of the second characteristic points may be matched with each other. For example, pixels (x_img_min, y_img_min) in the detection region 710 may be matched with 3D coordinates (x_min, y_min, z_min) of the object volume 720. According to an embodiment, when determining pixels to be matched, pixels corresponding to a hidden or cut-off portion may be excluded.

Referring again to FIG. 6A, if the coordinates of the matching pixels are set to be (x_img, y_img), and the matching 3D coordinates are set to be (x, y, z), an equation is obtained in which the location of the volume is unknown. Here, the 3D coordinates may be those when the volume is assumed to be located at the origin of the 3D coordinate system and may be expressed by the size of the volume.

Figures 7A, 7B:
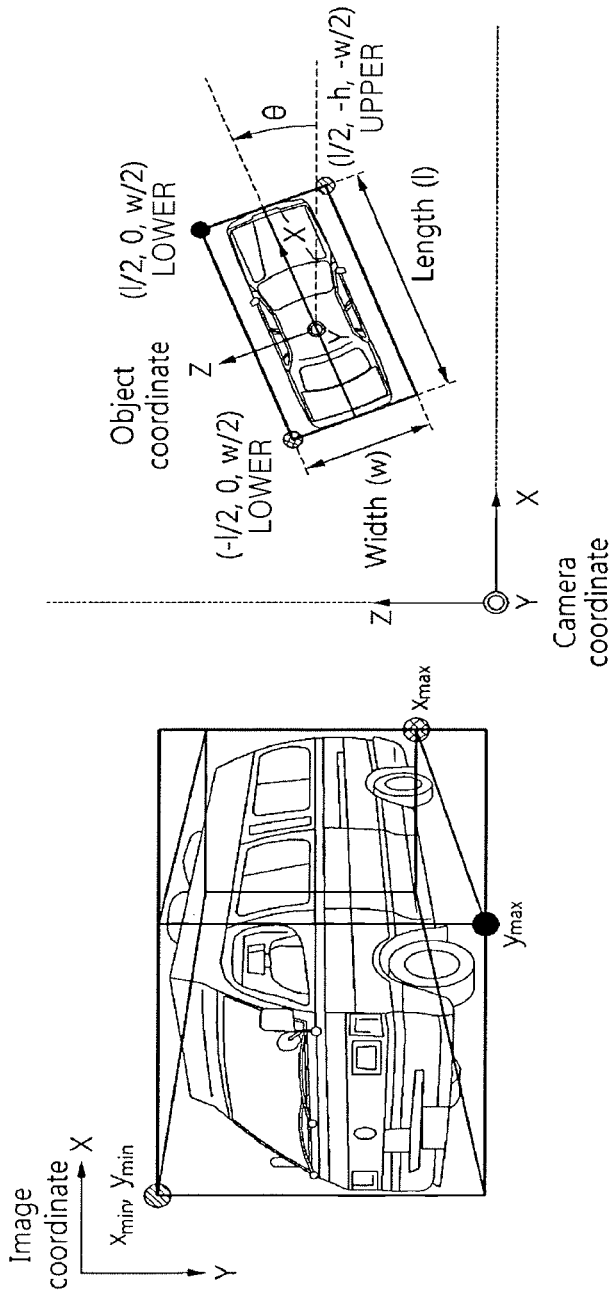
FIGS. 7A and 7B illustrate views of a method of calculating the location of a volume, according to an embodiment.

FIGS. 7A and 7B show a method of calculating the location of a volume by matching 2D image pixels with 3D coordinates. For example, in the left 2D image of FIG. 7A, the x-coordinate and y-coordinate of a pixel corresponding to an upper right end of a front side of a vehicle when viewed from the inside of the vehicle are $x_{min}$ and $y_{min}$. In addition, when viewed from the inside of the vehicle, the y-coordinate of a pixel corresponding to a lower left end of the front side of the vehicle is $y_{max}$, and the x-coordinate of a pixel corresponding to a lower left end of a rear side of the vehicle is $x_{max}$.

As shown in a 3D coordinate system on the right side of FIG. 7A, the pixels are matched with corners of a volume, and thus $T_x$, $T_y$, and $T_z$ may be calculated using a relational equation shown in FIG. 7B. The coordinates ($T_x$, $T_y$, $T_z$) may be 3D coordinates corresponding to the location of the volume, e.g., the center of a lower surface of the volume.

When there are three or more pairs of pixels and 3D coordinates that are matched with each other, the location of the volume in the 3D coordinate system may be definitively calculated. According to an embodiment, even when there are two pairs of pixels and 3D coordinates that are matched with each other, the location of the volume may be determined by further considering the pitch of a ground plane in the 2D image. For example, an object in a traveling image may be an adjacent vehicle, and it may be assumed that the vehicle is traveling in parallel to the ground plane in the traveling image. Therefore, if the pitch of a volume is set to be identical to the pitch of the ground plane, the location of the volume may be definitively determined even though there are only two pairs of pixels and 3D coordinates that are matched with each other. Alternatively, even when there are three or more pairs of pixels and 3D coordinates that are matched with each other, the location of the volume may be determined by further considering the pitch of the ground plane.

Referring again to FIG. 3, the candidates 330 for the location of the volume which correspond to the global direction candidates 320 may be estimated. One of the volume location candidates 330 may be selected as a location candidate 335. For example, after the volume location candidates 330 are estimated, volumes corresponding to the volume location candidates 330 may be projected onto the 2D image, and then one of the volume location candidates 330 may be selected as a location candidate 335 by comparing the object detection region 317 in the 2D image with projection regions to which the volume location candidates 330 are projected.

For example, in the 3D coordinate system, the volume may be specified based on location, size, and orientation, and location candidates may respectively be determined for the global direction candidates. Since the size of the volume is given, volume candidates corresponding to the location candidates may be determined. The projection regions may be obtained by projecting the volume candidates onto the 2D image. A projection region maximally overlapping the detection region 317 or having a value equal to or greater than a predetermined critical value may be selected, and the location candidate 335 corresponding to the selected projection region may be selected.

When the location candidate 335 is selected, a ray direction is calculated using a projection image corresponding to the location candidate 335. The global direction 340 may be determined by adding the ray direction and the local direction 319, as described previously with reference to FIG. 4.

Once the global direction 340 is determined in the current iteration, next global direction candidates may be generated based on the global direction 340 in the next iteration. For example, global direction candidates having a search range smaller than the search range in the previous iteration but a resolution higher than the resolution in the previous iteration may be generated on the basis of the global direction 340.

Figure 8:
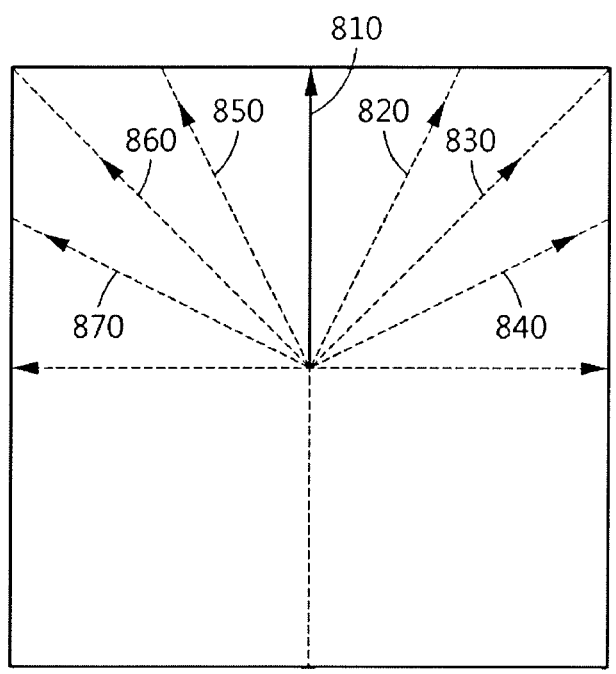
FIG. 8 illustrates a view of a method of determining candidates for the direction of a volume through iterations, according to an embodiment.

Referring to FIG. 8, it may be assumed that a direction 810 was determined as a global direction in the previous iteration. In this case, global direction candidates 820, 830, 840, 850, 860, and 870 may be generated within a search range of 0 to π at a resolution of π/8. According to an embodiment, since the shape of the volume is symmetrical in the direction of the volume, the search range may be set to be from π/4 to 3π/4, which is smaller than the search range of the previous iteration.

After a final global direction is determined by iteratively searching for global direction candidates, the volume 350 may be detected or restored based on the final global direction. After the final global direction is determined, the final location of the volume 350 may be estimated using the relational equation shown in FIG. 6A because the size of the volume is given. Once the final global direction, the final location, and the final size of the volume 350 are determined, the volume 350 may be detected or restored.

Figure 9:
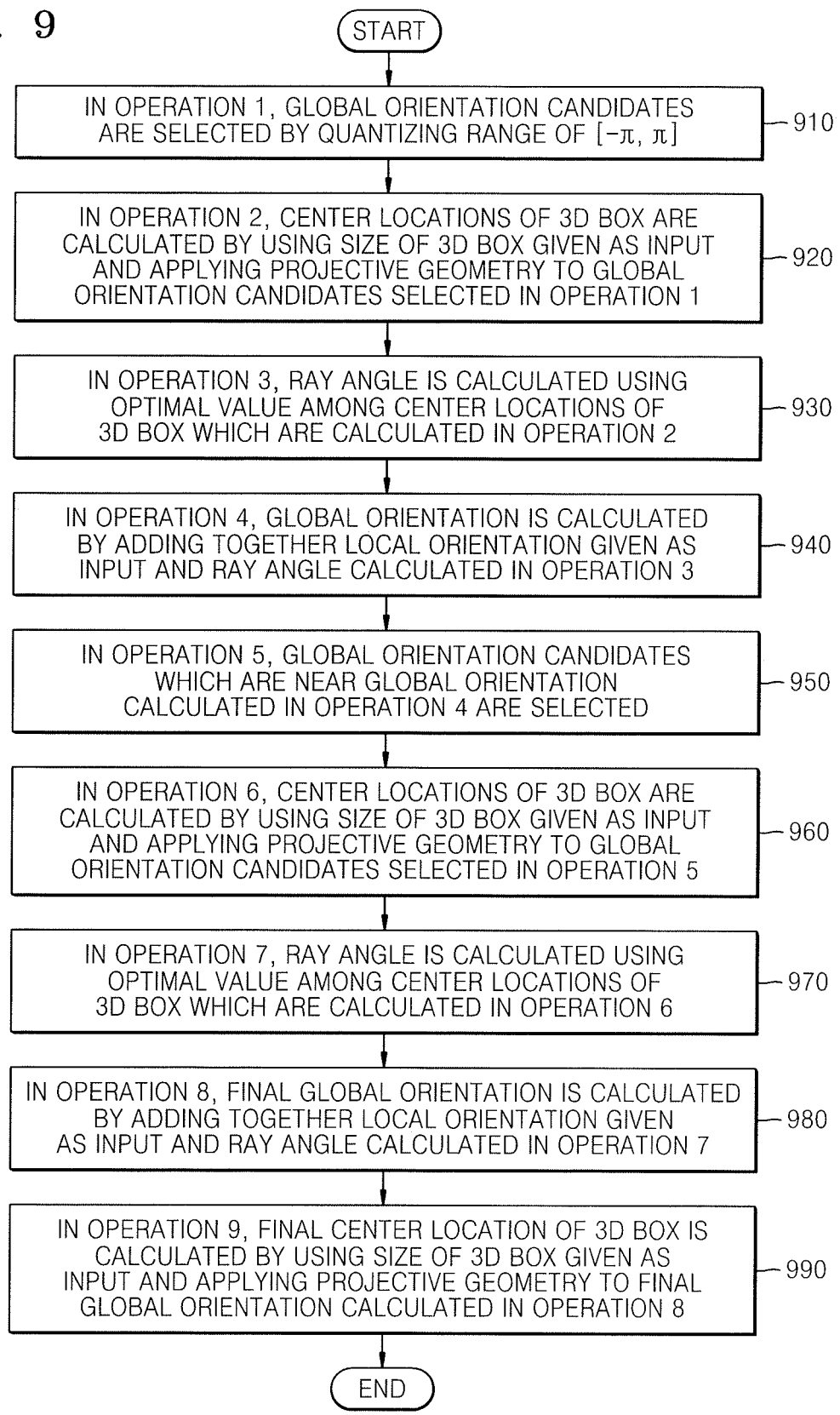
FIG. 9 illustrates an operational flowchart of a method of detecting a 3D object from a 2D image, according to an embodiment.

FIG. 9 is a flowchart illustrating a method of detecting a 3D object from a 2D image according to an embodiment.

Referring to FIG. 9, in operation 1, global orientation candidates are selected by quantizing a range of [−π, π] (910). The global orientation candidates respectively correspond to global direction candidates.

In operation 2, a center location of a 3D box is calculated by using the size of the 3D box given as an input and applying projective geometry to the global orientation candidates selected in operation 1 (920). The 3D box corresponds to a 3D volume, and the center locations of the 3D box correspond to the location of the 3D volume. According to an embodiment, in operation 2, the center locations of the 3D box may be calculated by further considering the pitch of a ground plane.

In operation 3, a ray angle is calculated using an optimal value among the center locations of the 3D box which are calculated in operation 2 and correspond to the global orientation candidates (930). The optimal value may be determined based on overlapping regions between a 2D detection region and projection images of the 3D box corresponding to the global orientation candidates.

In operation 4, a global orientation is calculated by adding together a local orientation given as an input and the ray angle calculated in operation 3 (940). The local orientation corresponds to a local direction, and the global orientation corresponds to a global direction.

In operation 5, global orientation candidates, which are near the global orientation, calculated in operation 4 are selected (950).

In operation 6, the center locations of the 3D box are calculated by using the size of the 3D box given as an input and applying projective geometry to the global orientation candidates selected in operation 5 (960). According to an embodiment, in operation 6, the center locations of the 3D box may be calculated by further considering the pitch of the ground plane.

In operation 7, a ray angle is calculated using an optimal value among the center locations of the 3D box which are calculated in operation 6 and correspond to the global orientation candidates (970). In operation 8, a final global orientation is calculated by adding together the local orientation given as an input and the ray angle calculated in operation 7 (980).

In operation 9, a final center location of the 3D box is calculated by using the size of the 3D box given as an input and applying projective geometry to the final global orientation calculated in operation 8 (990). According to an embodiment, in operation 9, the final center location of the 3D box may be calculated by further considering the pitch of the ground plane.

Figure 10:
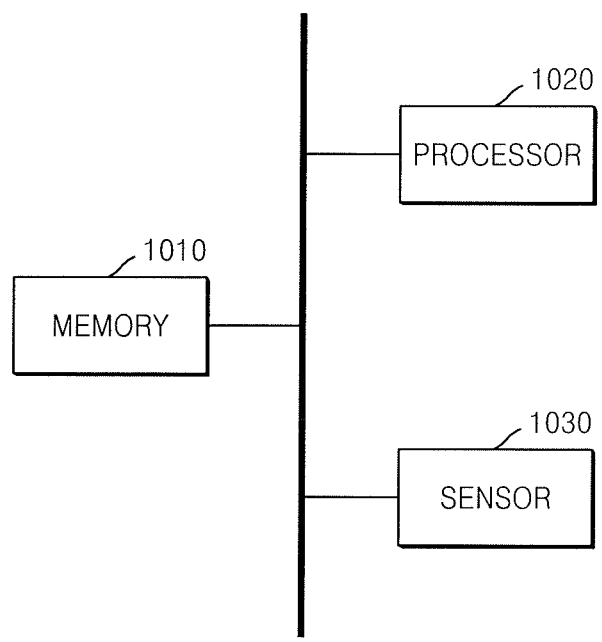
FIG. 10 illustrates a block diagram of an object detection apparatus according to an embodiment.

FIG. 10 is a block diagram illustrating an electronic system according to an embodiment. Referring to FIG. 10, the electronic system includes at least one processor 1020 and a memory 1010. The electronic system may further include a sensor 1030. The processor 1020, the memory 1010, and the sensor 1030 may communicate with each other via a bus.

The processor 1020 may perform at least one of the methods described above with reference to FIGS. 1 to 9. The memory 1010 may store images captured using the sensor 1030. The memory 1010 may be a volatile memory or a non-volatile memory. The processor 1020 may execute programs and may control the electronic system. Program code executable on the processor 1020 may be stored in the memory 1010.

The electronic system may be connected to an external device, e.g., a personal computer or a network, through an input/output device and may exchange data with the external device. The electronic system may include various electronic systems, e.g., a server device or a client device.

The above-described embodiments may be implemented with hardware elements, software elements, and/or combinations of hardware and software elements. For example, devices, methods, and elements described in the above embodiments may be implemented with at least one general-purpose or special-purpose computer such as a processor, a controller, an arithmetic logic unit (ALU), a digital signal processor, a microcomputer, a field programmable gate array (FPGA), a programmable logic unit (PLU), a microprocessor, or any other device capable of performing instructions and responding to instructions. A processing device may execute an operating system (OS) and at least one software application running on the operating system. In addition, the processing device may access, store, manipulate, process, and generate data in response to execution of software. For ease of understanding, the case of using a single processing device may be described. However, those of ordinary skill in the art will recognize that the processing device may include a plurality of processing elements and/or a plurality of types of processing elements. For example, the processing device may include a plurality of processors, or a processor and a controller. Other processing configurations such as parallel processors may also be possible.

Software may include a computer program, a code, an instruction, or a combination of at least one thereof. In addition, processing devices may be configured to operate in a desired manner and may be independently or collectively instructed. Software and/or data may be permanently or temporarily embodied in a certain machine, a component, a physical device, virtual equipment, a computer storage medium or device, or propagating signal waves so as to be interpreted by a processing device or provide instructions or data to the processing device. Software may be distributed over network-coupled computer systems and may be stored and executed in a distributed fashion. Software and data may be stored in at least one computer-readable recording medium.

The methods of the embodiments may be implemented as program instructions executable on various computers and may then be stored in computer-readable recording media. The computer-readable recording media may include, individually or in combination, program instructions, data files, data structures, etc. The program instructions stored in the media may be those designed and configured according to the embodiments or well known in the computer software industry. The computer-readable recording media may include hardware specifically configured to store program instructions and execute the program instructions, and examples of the hardware include magnetic media, e.g., hard disks, floppy disks, and magnetic tapes; optical media such as CD-ROMs and DVDs; magneto-optical media such as floptical disks; and ROMs, RAMs, and flash memories. Examples of the program instructions may include machine codes made by compilers and high-level language codes executable on computers using interpreters. The above-mentioned hardware device may be configured to operate via one or more software modules to perform operations according to embodiments, and vice versa.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of detecting a 3D object from a 2D image, the method comprising:
  receiving a 2D image including an object;
  acquiring an object detection region from the 2D image;
  iteratively searching for candidates for a direction of a volume including the object of the 2D image in a 3D coordinate system based on the object detection region; and
  detecting the volume from the 3D coordinate system based on results of the iterative searching,
  wherein the iterative searching includes generating a plurality of candidates for the direction of the volume based on a predetermined search range and a predetermined resolution.

2. The method as claimed in claim 1, wherein, in the 2D image, at least a portion of the object is hidden by another object or cut off along a boundary of the 2D image.

3. The method as claimed in claim 1, wherein the iterative searching further includes:
  estimating candidates for a location of the volume in the 3D coordinate system based on the generated candidates for the direction of the volume and a size of the volume;
  selecting one of the estimated candidates for the location of the volume based on the object detection region and projection regions of the volume corresponding to the estimated candidates for the location of the volume; and
  determining the direction of the volume in the 3D coordinate system based on the selected one candidate for the location of the volume and a direction of the object in the 2D image.

4. The method as claimed in claim 3, wherein generating the candidates for the direction of the volume includes generating the candidates for the direction of the volume based on a direction of the volume determined in a previous iteration.

5. The method as claimed in claim 3, wherein generating the candidates for the direction of the volume includes generating the candidates for the direction of the volume based on a search range smaller than a search range of a previous iteration and a resolution higher than a resolution of the previous iteration.

6. The method as claimed in claim 3, wherein estimating the candidates for the location of the volume includes determining candidates for the location of the volume which correspond to the candidates for the direction of the volume and the size of the volume based on a corresponding relationship between characteristic points of the object detection region and characteristic points of the volume.

7. The method as claimed in claim 6, wherein estimating the candidates for the location of the volume further includes excluding characteristic points corresponding to a cut-off or hidden portion of the object from the characteristic points of the object detection region.

8. The method as claimed in claim 6, wherein determining the candidates for the location of the volume includes determining the candidates for the location of the volume, which correspond to the candidates for the direction of the volume and the size of the volume, by further considering a pitch of a ground plane of the 2D image.

9. The method as claimed in claim 3, wherein selecting one of the candidates for the location of the volume includes:
calculating sizes of overlapping regions between the projection regions and the object detection region;
selecting one of the projection regions based on the sizes of the overlapping regions; and
selecting a candidate for the location of the volume which corresponds to the selected projection region.

10. The method as claimed in claim 1, wherein detecting the volume includes determining a location of the volume in the 3D coordinate system based on a size of the volume acquired from the 2D image and the direction of the volume acquired from results of the searching.

11. The method as claimed in claim 10, wherein determining the location of the volume includes determining the location of the volume which corresponds to the direction of the volume and the size of the volume based on a corresponding relationship between characteristic points of the object detection region and characteristic points of the volume.

12. The method as claimed in claim 1, wherein acquiring the object detection region include acquiring the object detection region including the object, a direction of the object in the 2D image, and a size of the volume in the 3D coordinate system by using a neural network recognizing the 2D image.

13. A computer program stored on a medium for executing the method of claim 1.

14. An apparatus for detecting a 3D object from a 2D image, the apparatus comprising:
a memory to store a 2D image including an object; and
at least one processor to acquire an object detection region from the 2D image, to iteratively search for candidates for a direction of a volume including the object in a 3D coordinate system based on the detection region, and to detect the volume from the 3D coordinate system based on results of the search,
wherein the at least one processor is to generate a plurality of candidates for the direction of the volume based on a preset search range and a preset resolution.

15. The apparatus as claimed in claim 14, wherein, in the 2D image, at least a portion of the object is hidden by another object or cut off along a boundary of the 2D image.

16. The apparatus as claimed in claim 14, wherein, for the iteratively searching, the at least one processor is further to:
estimate candidates for a location of the volume in the 3D coordinate system based on the candidates for the direction of the volume and a size of the volume;
select one of the candidates for the location of the volume based on the detection region and projection regions of the volume corresponding to the candidates for the location of the volume; and
determine the direction of the volume in the 3D coordinate system based on the selected candidate for the location of the volume and a direction of the object in the 2D image.

17. The apparatus as claimed in claim 16, wherein the at least one processor is further to generate the candidates for the direction of the volume based on a direction of the volume determined in a previous iteration.

18. The apparatus as claimed in claim 16, wherein the at least one processor is further to generate the candidates for the direction of the volume based on a search range smaller than a search range of a previous iteration and a resolution higher than a resolution of the previous iteration.

* * * * *